United States Patent [19]

Stemme et al.

[11] 4,202,616
[45] May 13, 1980

[54] FILM-TRANSPORT SYSTEM FOR PHOTOGRAPHIC STILL CAMERA

[75] Inventors: Otto Stemme, Munich; Rolf Schröder, Baldham; Peter Lermann, Narring; Horst Karl, Munich, all of Fed. Rep. of Germany

[73] Assignee: AGFA-Gevaert, A.G., Leverkusen, Fed. Rep. of Germany

[21] Appl. No.: 939,374

[22] Filed: Sep. 5, 1978

[30] Foreign Application Priority Data

Sep. 5, 1977 [DE] Fed. Rep. of Germany ....... 2739930

[51] Int. Cl.² .................... G03B 1/18; G03B 17/26; G03B 1/00
[52] U.S. Cl. ................................ 354/173; 354/213; 354/275
[58] Field of Search ............... 354/170, 173, 204, 206, 354/212–214, 275

[56] References Cited

U.S. PATENT DOCUMENTS

| | | | |
|---|---|---|---|
| 2,969,722 | 1/1961 | Schwartz | 354/173 |
| 3,135,182 | 6/1964 | Hintze et al. | 354/173 |
| 3,470,803 | 10/1969 | Fukuoka et al. | 354/173 |
| 4,001,849 | 1/1977 | Takahashi | 354/207 |
| 4,075,644 | 2/1978 | Hosono | 354/213 X |

*Primary Examiner*—Donald A. Griffin
*Attorney, Agent, or Firm*—Michael J. Striker

[57] ABSTRACT

When the trigger button is depressed, a crank rod is pulled by a biasing spring in a first direction from a first to a second position triggering the shutter in the process, and an associated crankwheel drives a gear segment coupled thereto to an angular position engaging a motor-driven transmission, which latter then drives the gear segment, crankwheel and thereby the crank rod in an opposite second direction back to first position, the crank rod resetting the shutter in the process, whereupon the gear segment reaches an angular position once more disengaged from the film-transport motor. A switch-control lever coupled to a perforation feeler keeps a motor-energize switch closed until the feeler enters a film perforation, but a switch-control lever redundantly keeps the motor-energize switch closed under the camming action of the crank rod, whereby if film is present in the camera motor energization terminates when the feeler enters a perforation, whereas if film is not present then, for demonstration purposes, the same operations are performed, but with motor energization terminating in dependence upon crank rod position.

24 Claims, 1 Drawing Figure

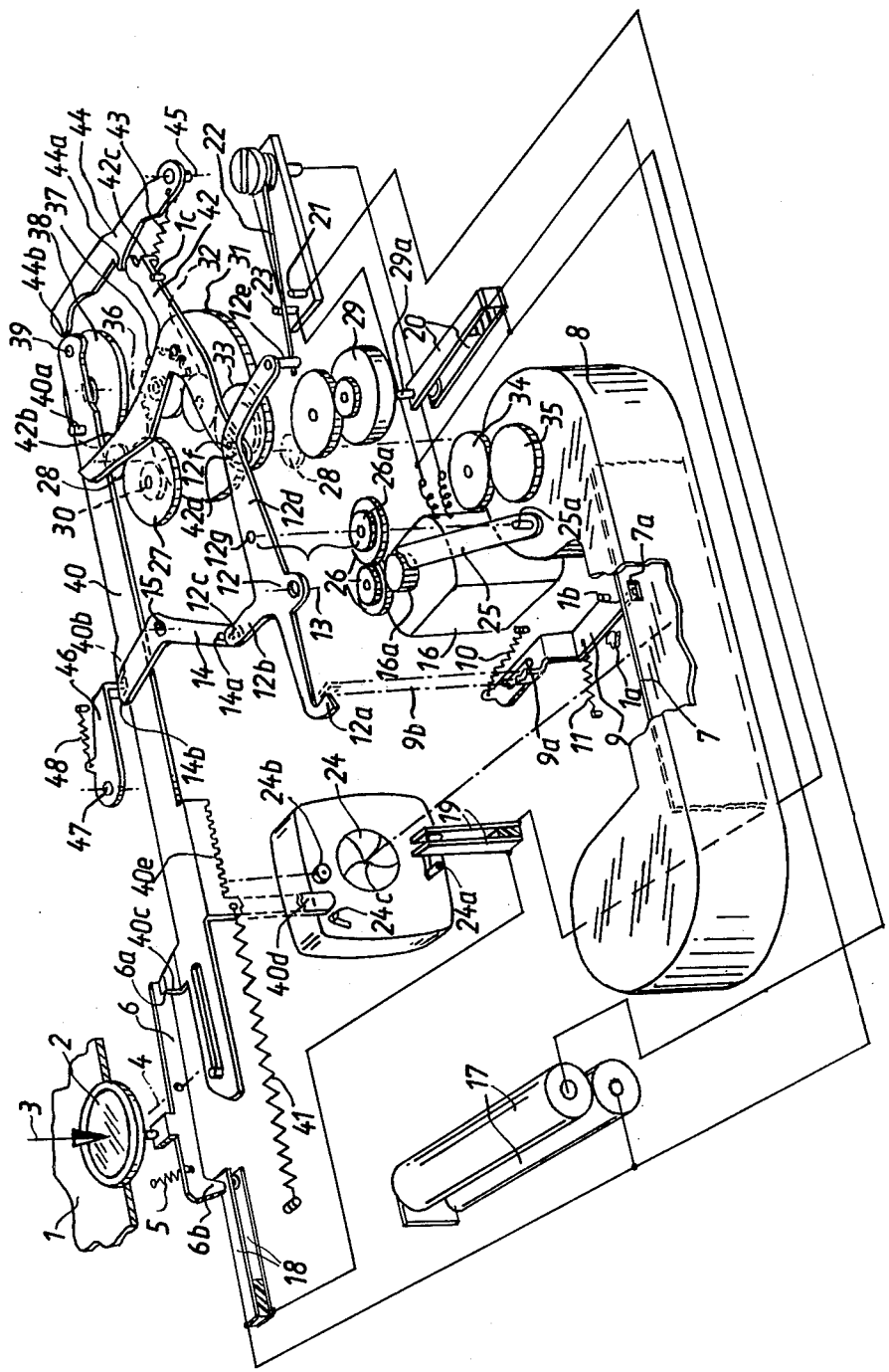

FILM-TRANSPORT SYSTEM FOR PHOTOGRAPHIC STILL CAMERA

BACKGROUND OF THE INVENTION

The present invention concerns film-transport systems for photographic still cameras, preferably those which accommodate cassette film, of the type using a perforation feeler which enters into film-frame perforations and including an electric film-transport and shutter-setting motor, and means for terminating motor energization and short-circuiting the motor when the feeler enters into a film perforation.

A film-transport system of this general type is disclosed in Federal Republic of Germany Offenlegungsschrift DT-OS No. 2,641,035. That transport system is electronically controlled.

SUMMARY OF THE INVENTION

It is the general object of the invention to provide a film-transport system of the type in question, but wherein the various operations incident to film transport are controlled by mechanical means of simple design and inherently reliable operation. Furthermore, the mechanically controlled motor-driven film-transport system is to be capable of distinguishing between those operations whose performance is not dependent upon the progressively changing amount by which the take-up spool must be turned to effect one-frame transport, on the one hand, and, on the other hand, those operations incident to one-frame transport which are thusly dependent.

The present invention provides a control mechanism for the film-transport system which includes, in addition to the perforation-sensing feeler, a control member, preferably a crank rod, which is spring-moved in a first direction from a first to a second position upon depression of the trigger button, as a result bringing a motion-transmitting structure coupled thereto into engagement with the film-transport motor, which then commences to return the control member in the opposite second direction back to first position, whereupon the motion-transmitting structure decouples from the drive motor. In the process of performing such movement, the control member can perform various operations, such as trigger the shutter unit during its first-direction travel, reset the shutter unit during its second-direction or return travel, and also cooperate with other parts of the control mechanism in the determination of the settings of the motor-energize and motor-short-circuit switches connected to the film-transport and shutter-setting motor.

In the preferred embodiment of the invention, the control member is a crank rod coupled to a crankwheel, and the motor-transmitting structure is a gear segment coupled to the crankwheel. When the trigger button is depressed, a biasing spring moves the crank rod in the first direction from first position to second position. As this happens, the gear segment is turned by the crankwheel to an angular position in which it begins to be driven by a motor-driven transmission, this causing the crankwheel and therefore the crank rod to be driven by the motor back to first position. When first position is again reached, the gear segment will have come to an angular position once more disengaged from the motor-driven transmission.

The preferred embodiment of the inventive control mechanism disclosed herein also offers additional advantages. When the film-transport motor is driving the unperforated film leader and the feeler therefore is encountering no film perforations, film transport interrupts in a simple way when the feeler senses the perforation of the first actual film frame. Likewise, when the end of the film is reached and the film cannot be further transported, the disclosed control mechanism automatically terminates further motor energization.

Futhermore, the camera can be operated in a sequential-exposure mode, so long as the trigger button is kept depressed, the control member, i.e., preferably the aforementioned crankrod, being repeatedly spring-moved in the first direction and then motor-returned in the second direction, during sequential-exposure operation.

Also, the inventive control mechanism is so designed that the sequential-exposure capability of the camera can be demonstrated, e.g., to a potential purchaser, even without film in the camera, and therefore despite the absence of film-frame perforations for the perforation feeler to sense. Normally, a switch-control mechanism, controlled by the perforation feeler, keeps a motor-energize switch closed until the perforation feeler leaves its retracted position and enters a film perforation. However, with no film present in the camera, the perforation feeler stays in its non-retracted position. The switch-control mechanism, besides being controlled in this way by the perforation feeler, is redundantly controlled by the aforementioned crank rod. When film is present in the camera, the perforation feeler keeps the motor-energize switch closed after the crank rod ceases to do so. However, when no film is present in the camera, the motor-energize switch is kept closed under the control of the crank rod, so that the intermittent-transport and repeated shutter triggering and resetting incident to sequential-exposure operation can occur even with no film in the camera.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a greatly exploded perspective view of a preferred embodiment of the mechanically controlled film-transport system of the present invention.

DESCRIPTION OF THE PREFERRED EMBODIMENT

The single FIGURE is an exploded perspective view of a preferred embodiment of the inventive film transport system.

Numeral 1 denotes the housing of a still camera, only a very small part of the housing actually being shown. Provided on this part of the camera housing 1 is a trigger button 2. When trigger button 2 is depressed in the direction of arrow 3, it presses down upon a lateral tab on the left arm of a two-armed trigger lever 6. Trigger lever 6 is pivoted about a stationary horizontal pin indicated at 4. A tension spring 5 urges trigger lever 6 clockwise. The left end 6b of trigger lever 6 serves as a switch activator.

The illustrated camera uses film 7 provided with one perforation 7a per frame. Here the film 7 is accommodated in a cassete 8 comprising a supply compartment at the left, a take-up compartment at the right, and an intermediate bridge provided with an exposure window. The camera housing includes a stationary stop 1a and stationary camming pin 1b, between which can move a feeler 9. Feeler 9 has an elongated slot 9a, up through which extends a stationary vertical pin, mounting the feeler 9 for horizontal swinging movement about such pin, and also for horizontal shifting movement towards and away from the film 7. A tension spring 10 pulls feeler 9 towards the film 7, and a tension spring 11 pulls feeler 9 leftwards, i.e., opposite to the film transport direction. Feeler 9 has a bent-up vertical arm 9b. Vertical arm 9b extends up and ends in the vicinity of one arm 12a of a three-armed control lever 12. To facilitate visualization in this exploded perspective view, vertical arm 9b is shown in broken lines elongated up beyond its actual length, to make clear its cooperation with lever arm 12a. Three-armed control lever 12 is mounted for horizontal swinging movement about a stationary vertical pin, as indicated at 13. The second arm 12b of three-armed control lever 12 carries a pin 12c which extends into a slot 14a at the end of a two-armed lever 14. Two-armed lever 14 is mounted for horizontal swinging movement about a stationary vertical pin, as indicated at 15. The third arm 12d of the control lever 12 is horizontally angled as shown and at its end carries a downwards extending vertical switch-control pin 12e. Control lever 12 also has an aperture 12g.

An electric motor 16 drives the illustrated film-transport system, and is energized by batteries 17. In the current path between motor 16 and batteries 17, there is connected a switch 18 which closes when pressed down by the left end 6b of two-armed trigger lever 6, i.e., upon depression of trigger button 2. Connected in series with switch 18 is a switch 19. Connected in parallel to the series-combination of switches 18, 19 is a switch 20. Connected in series with the parallel combination of switches 18, 19 and 20 is a further switch 21, 22. Switch 21, 22 comprises a stationary contact 21 and a moving contact 22. Moving contact 22 also cooperates with a further stationary contact 23, so as to act as a changeover switch. When moving contact 22 engages stationary contact 23, this directly shortcircuits the drive motor 16.

Numeral 24 denotes the shutter unit of the camera. The shutter unit 24 has a geared wind-up pinion 24b. When wind-up pinion 24b is turned counterclockwise, it idles; when it is turned clockwise it winds-up or otherwise sets the shutter, via an internal one-way coupling. When the shutter unit 24 is in wound-up or set condition, the shutter can be actuated by moving a shutter-trigger pin 24c from its illustrated position towards the other end of the slot through which it projects, whereupon the shutter will open and then close, after which the shutter unit 24 must then be wound-up or set again. The shutter unit 24 furthermore has a switch-actuating pin 24a projecting out through a slot. When shutter unit 24 is in set condition, i.e., ready to be triggered, switch-actuating pin 24a is, as illustrated, at the left end of its slot. When the shutter unit 24 is triggered, switch-actuating pin 24a moves to the right, closing electrical switch 19 towards or at the end of the shutter operation.

Drive motor 16 has an output pinion 16a which drives a speed-reducing transmission 26. Transmission 26 comprises two two-diameter gears. The drive pinion 16a meshes with the larger-diameter part of the first two-diameter gear; the smaller-diameter part of the first two-diameter gear meshes with the larger-diameter part of the second two-diameter gear; the smaller-diameter part 26a of the second two-diameter gear meshes with a gear 27 (shown further above in this exploded perspective view). Gear 27 meshes with the gear 28 of a centrifugal-force switch 29. To facilitate visualization, gear 28 is illustrated twice, once with a solid lead line to show its cooperation with gear 27, and once with a broken lead line to show its cooperation with centrifugal-force switch 29. Centrifugal-force switch 29 has a downwardly extending switch-actuating pin 29a. Whenever motor 16 is running, pin 29a presses down upon electrical switch 20, keeping switch 20 closed; whenever motor 16 is not running, switch 20 is open. Numeral 25 denotes a braking lever, one end of which can move into and out of engagement with motor drive pinion 16a. The other end of braking lever 25 carries a pin 25a which extends upwards through the aperture 12g in three-armed control lever 12. Braking lever 25 either brakes or does not brake motor drive pinion 16a, depending upon the position of control lever 12, as described further below.

Rigidly coupled to gear 27 is a smaller-diameter gear 30, e.g., of one piece therewith. Gear 30 meshes with a large gear 31. Rigidly coupled to large gear 31 is a smaller diameter gear 32, e.g., of one piece therewith. Gear 32 meshes with a gear 33, and gear 33 with a gear 34, and gear 34 with a gear 35. Gear 35 is coupled to and drives the take-up core located in the interior of the right or take-up end of the cassette 8.

A gear segment 37 and a crankwheel 38 are both mounted for rotation about a common stationary vertical pin, an indicated at 36. Gear segment 37 and crankwheel 38 are rigidly coupled to each other, i.e., they share rotation. Depending upon the angular position of crankwheel 38, gear segment 37 does or does not mesh with gear 27. When gear segment 37 meshes with gear 27, it is driven by the latter. The crankwheel 38 carries an eccentrically located vertical pin 39. Pivotally mounted on pin 39 is the right end of a long crank rod 40. Crank rod 40 carries a vertical camming pin 40a. Approximately midway between its right and left ends, crank rod 40 has a rearwardly extending projection, the left edge 40b of which acts as a holding edge, whose purpose is described below. Near its left end, crank rod 40 has a bent-up vertical tab, the left edge 40c of which acts as a trigger edge. At its left end, crank rod 40 has an elongated slot, up through which projects a stationary vertical pin (no reference numeral) which guides crank rod 40 for lengthwise displacement. Crank rod 40, near its left end, has a bent-down part, the bottom edge of which is configured as a rack 40e. Rack 40e meshes with the wind-up or setting pinion 24b of the shutter unit 24. A tension spring 41 is connected to this bent-down part of crank rod 40 and pulls crank rod 40 leftward, i.e., in the direction opposite to the wind-up direction for wind-up pinion 24b. This bent-down part of crank rod 40 extends further down as a trigger arm 40d. When crank rod 40 moves to the left, trigger arm 40d displaces pin 24c, thereby triggering shutter unit 24.

Numeral 42 denotes a second three-armed lever. The first arm 42a of this lever has a slot, through which extends a vertical pin 12f carried by the arm 12d of the three-armed control lever 12. The second arm of three-armed lever 42 is located in the path of movement of pin 40a and its right edge is configured as a camming surface 42b. The third arm of lever 42 has a holding edge 42c. A tension spring 43 pulls lever 42 towards a stationary stop 1c. Numeral 44 denotes a one-armed lever mounted for horizontal swinging movement about a vertical pin, as indicated at 45. One end of the just mentioned tension spring 43 is connected to three-armed lever 43, and the other end of spring 43 is connected to one-armed lever 44. Lever 44 has a leftwards projection, the back edge 44a of which is a blocking edge. Spring 43 pulls blocking edge 44a towards the holding edge 42c, and also pulls the rear end 44b of lever 44 towards the right end of the crank rod 40. Numeral 46 denotes a further one-armed lever mounted for horizontal swinging movememt about a stationary vertical pin, as indicated at 47. The earlier mentioned two-armed lever 14, at its rearward end, has a rearwards facing control edge 14b. A tension spring 48 pulls one-armed lever 46 towards the control edge 14b and into a position blocking the holding edge 40b of the crank rod 40.

The illustrated film-transport system is shown in the FIGURE in the setting which it assumes upon completion of a film-transport operation. The electrical switches 18, 19, 20, 21 are all open, and the motor 16 is short-circuited by the switch 22, 23. The blocking edge 6a of the trigger lever 6 blocks the trigger edge 40c of the crank rod 40, holding the latter in its cocked position, i.e., with tension spring 41 stretched as shown. The front end of feeler 9 extends into a film-frame perforation 7a. Because of this, and via the engagement between arm 9b and arm 12a, three-armed lever 12 causes two-armed lever 14 to push, at its rearwards control edge 14b, against the one-armed lever 46, keeping the latter swung back away from the holding edge 40b; i.e., in the illustrated setting of the system, the crank rod 40 is not blocked at its holding edge 40b.

Now, assume that the user depresses trigger button 2. Trigger lever 6 swings counterclockwise, its switch-actuating part 6b closing switch 18. Switch 18 stays closed so long as trigger button 2 continues to be depressed. At the same time, blocking edge 6a moves up out of the path of trigger edge 40c, thereby releasing crank rod 40. Tension spring 41 begins to pull crank rod 40 leftwards, i.e., opposite to the film-transport direction. As a result crankwheel 38 and together therewith gear segment 37 begins to turn. As crank rod 40 moves leftward, its downwardly projecting trigger arm 40d displaces trigger pin 24c leftwards, thereby triggering a shutter operation. Upon completion of the shutter operation, pin 24a closes switch 19, so that now both switches 18, 19 are closed.

Furthermore, simultaneously with the foregoing, the first tooth of gear segment 37 has begun to mesh with gear 32. Also, the pin 40a on crank rod 40 has engaged the camming surface 42b of the second two-armed lever 42 and has swung lever 42 counterclockwise to such an extent that the blocking edge 44a of one-armed lever 44 latches in front of the holding edge 42c of second two-armed lever 42 and holds lever 42 in that position. Also, this counterclockwise swinging of lever 42, due to the pin and slot coupling at 42a, 12f, has caused the first three-armed lever 12 to turn clockwise so that its arm 12a has moved back and unblocked arm 9b and also caused braking lever 25 to move away from motor drive pinion 16a.

As a result of such clockwise displacement of three-armed lever 12, its pin 12e ceases to press the springy movable contact 22 into engagement with stationary contact 23, so that contact 22 due to its own spring action has now moved into engagement with stationary contact 21. Because now the three switches 18, 19 and 21, 22 are all closed, the motor 16 begins to operate. However, as soon as motor 16 starts up, the switch-actuating pin 29a of centrifugal switch 29 closes switch 20, and keeps switch 20 closed so long as the motor is running. Accordingly, the user can now let go of trigger button 2, and although switch 18 then opens, switch 20, being connected in parallel to the series combination of switches 18, 19, keeps the motor 16 energized. Because of this, when switch 19 too later opens, i.e., upon resetting of the shutter unit 24, this likewise will not terminate motor energization.

With the motor 16 now running, the crankwheel 38 is driven counterclockwise, via the gear segment 37 and the gear 32. As a result, the crank rod 40 is pulled rightwards, i.e., in the film-transport direction, against the opposition of tension spring 41. Also, through the intermediary of gears 31-35, the take-up spool in the film cassette 8 is turned, resulting in film transport.

During the first phase of film transport, the part of film 7 just upstream of film perforation 7a pushes the end of perforation feeler 9 rightwards, but as this happens the camming pin 1b is engaged by the slanting camming surface at the right edge of feeler 9, causing feeler 9 to retract away from the film 7. As soon as the feeler 9 has emerged from film perforation 7a, tension spring 11 pulls feeler 9 leftwards until feeler 9 hits stop 1a. As a result, feeler 9 cannot enter a second time into this same film perforation 7a. Instead, under the action of its springs 10, 11, the feeler 9 is pressed leftwards against stop 1a and forwards against the film 7. With feeler 9 in this setting during the film-transport operation, the tension spring 43 is urging the three-armed lever 42 clockwise and the latter is urging the three-armed lever 12 conterclockwise, with the front edge at the very end of arm 12a pressed against the back edge of arm 9b, so that feeler 9 is additionally pressed against film 7 from behind. Also, because arm 12a is pressing against arm 9b, three-armed lever 12 cannot turn further counterclockwise, and three-armed lever 42 cannot turn further clockwise, i.e., despite the pull exerted upon lever 42 by tension spring 43. As a result, during the remainder of the film-transport operation, neither of the three-armed levers 12, 42 can leave the position just described, i.e., even when, somewhat later during the rightwards travel of crank rod 40, pin 40a no longer blocks lever 42 against clockwise movement and blocking edge 44a likewise no longer blocks lever 42 against clockwise movement; blocking edge 44a ceases to block clockwise movement of lever 42, when the right end of crank rod 40 displaces the free end 44b of one-armed lever 44 rightwards. Also, with three-armed lever 12 arrested in the position just described, it can no longer push one-armed lever 46 back via two-armed lever 14. As a result, the free end of one-armed lever 46 is not being pushed back out of the path of movement of holding edge 40b. This makes it impossible for the tension spring 41 to again pull crank rod 40 leftwards prior to completion of the still ongoing film-transport operation.

As the crank rod 40 moves rightwards, i.e., in the film-transport direction, its rack 40e drives wind-up pinion 24b clockwise, thereby winding-up or otherwise setting shutter unit 24 to a condition again ready to be triggered. With shutter unit 24 thusly reset, switch-actuating pin 24a reassumes its illustrated position permitting electrical switch 19 to open. As mentioned just above, because the series-connected switches 18, 19, both of which are now open, are shunted by closed switch 20, the drive motor 16 continues to be energized.

During the leftwards and then rightwards movement of crank rod 40, pin 40a slides along the cam surface 42b of three-armed lever 42 until, at the completion of one rotation of crankwheel 38, the crank rod 40 has returned to the position illustrated in the FIGURE. The gear segment 37 has turned to such an extent that it now ceases to mesh with gear 32, and the right end of crank rod 40 pushes the free end of one-armed lever 44 leftwards against the force of tension spring 43, as a result of which blocking edge 44a moves rightwards out of the path of holding edge 42c, thereby releasing the second three-armed lever 42.

At this point, the film-transport operation has not yet been completed, and the arm 12a is pressing forwards against the arm 9b of feeler 9, which latter continues to be pressed against the film 7. Due to this, the levers 12, 42 still cannot turn back to their starting positions, and the switches 20 and 21, 22 continue to stay closed and the motor 16 continues to operate. When, finally, upon completion of the one-frame film-transport operation, the feeler 9 enters into the next film-frame perforation 7a, feeler 9 now allows three-armed lever 12 to turn counterclockwise and therefore the second three-armed lever 42 to turn clockwise. When lever 12 turns counterclockwise, its switch-controlling pin 12e moves springy contact 22 out of engagement with stationary contact 21, thereby terminating motor energization, and furthermore into engagement with stationary contact 23, thereby short-circuiting the motor. The kinetic energy of the motor is then almost instantly converted into dissipated electrical energy, and the motor therefore comes to a standstill. As a result, the pin 29a of centrifugal-force switch 29 rises permitting switch 20 to open again, at which point all switches in the motor-current path are in open setting. During the turning of three-armed lever 12, the braking lever 25 has come into engagement with the motor output pinion 16a, and the rearwards facing control edge 14b of lever 14b has once again pushed one-armed lever 26 rearwards out of the path of movement of the holding edge 40b of crank rod 40. At this point, both the shutter operation and the film-transport operation are entirely completed, and the film-transport system is once more in the setting depicted in the FIGURE.

If the camera is to operate in the sequential-exposure mode, the user maintains trigger button 2 depressed for as long as the exposure sequence is to continue. Each constituent shutter operation and film-transport operation is then performed in the manner already described, but with switch 18 staying uninterruptedly closed and the blocking edge 6a uninterruptedly located out of the path of movement of trigger edge 40c. During the time interval between the completion of one complete rotation of crankwheel 38 and the termination of a film-transport operation, the gear segment 37 is not meshing with gear 32 and the one-armed lever 46 is located in the path of movement of holding edge 40b, i.e., until the feeler 9 enters into the next film-frame perforation 7a; this serves to assure that the crank rod 40 cannot again be triggered until the still ongoing film-transport operation is finished, i.e., until feeler 9 enters the next perforation.

When cassette film 7, 8 of the type shown is employed, the trailing end of the film cannot be pulled out of the supply compartment into the take-up compartment of the cassette. When this point is reached, the lever 12 assumes its film-transport setting, because the feeler 9 is presented with no next perforation into which to enter. Because the film 7 in the cassette 8 cannot be transported any further, the film-transport system blocks, and the drive motor 16 comes to a halt. As a result the centrifugal-force switch 29 opens switch 20, and motor energization terminates. If thereafter the user lets go of trigger button 2 and then inserts a fresh cassette 8 into the camera, all components will reassume the positions shown in the FIGURE.

If no cassette 8 is present in the camera, the feeler 9 is held against stop 1a, and is displaced forwards, i.e., in the direction towards where film would normally be, a distance corresponding to the length of its slot 9a. As a result lever 46 is kept pushed back, out of the path of movement of holding edge 40b. In itself this is without significance in such situation, because the trigger edge 40c is blocked by blocking edge 6a. If now it is desired to demonstrate the operation of the camera, e.g., to a potential purchaser, with no film cassette present in it, the user presses trigger button 2. The sequence of operations described above now occur in substantially the same way. The switch 21, 22 is kept closed, until completion of one rotation of crankwheel 38, by means of the lever 44 via the second three-armed lever 42. Without performing an actual film transport, the shutter unit 24 is triggered, the motor switches 18, 19 21–22 and 20 close in sequence, the motor operates, the shutter unit 24 is reset and the motor stops with the switches opening in sequence in the way already described.

It will be understood that each of the elements described above, or two or more together, may also find a useful application in other types of constructions and circuits differing from the types described above.

While the invention has been illustrated and described as embodied in a still camera which uses cassette film, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constiture essential characteristics of the generic or specific aspects of this invention.

What is claimed as new and desired to be protected by Letters Patent is set forth in the appended claims:

1. In a photographic still camera, a film-transport system transporting film of the type each of whose frames has a perforation, including a shutter unit having a triggerable set state and a triggered unset state; an electric film-transport and shutter-setting motor; motor-energize switch means and motor-short-circuit switch means having states which do and do not energize and short-circuit the motor; and a control mechanism establishing at least one of said states, the control mechanism including a perforation feeler mounted for entry into and retraction from film perforations, a crankwheel and a crank rod coupled thereto, the crank rod being mounted for movement in a first direction from a first to a second position and in an opposite second direction back to the first position, the crankwheel performing one rotation in the course of such movement from and back to the first position, drive spring means urging the crank rod in the first direction, a user-activated trigger mechanism engaging the crank rod and when unactivated blocking movement of the rod in the first direction, the trigger mechanism when activated permitting the drive spring means to move the crank rod towards the second position and thereby rotate the crankwheel, a gear segment coupled to and driven by the crankwheel when the crank rod is moving in the first direction, a transmission driven by the motor, the angular span and angular position of the gear segment being such that after part of a crankwheel rotation the gear segment comes into engagement with and starts to be driven by the transmission thereby driving the crankwheel and moving the crank rod in the second direction back towards the first position whereupon the gear segment reaches an angular position losing engagement with the transmission.

2. In a camera as defined in claim 1, the drive spring means being permanently coupled to the crank rod and always urging the crank rod in the first direction.

3. In a camera as defined in claim 1, the user-activated trigger mechanism including a portion which physically obstructs the path of movement of the rod in the first direction when the user-activated trigger mechanism is unactivated but which moves out of the path of movement of the rod when the user-activated trigger mechanism is activated.

4. In a camera as defined in claim 1, the drive spring means being permanently coupled to the crank rod and always urging the crank rod in the first direction, the user-activated trigger mechanism including a portion which physically obstructs the path of movement of the rod in the first direction when the user-activated trigger mechanism is unactivated but which moves out of the path of movement of the rod when the user-activated trigger mechanism is activated.

5. In a camera as defined in claim 1, the angular span and angular position of the gear segment being such that the distance through which the crank rod is driven by the drive spring means in the first direction and the distance through which the crank rod is driven in the second direction by the motor-driven transmission are approximately equal.

6. In a photographic still camera, a film-transport system transporting film of the type whose frames are provided with perforations, including a shutter unit having a triggerable set state and a triggered unset state; an electric film-transport and shutter-setting motor; motor-control switch means having a motor-energize state and a motor-deenergize state; and a control mechanism establishing at least one of said states, the control mechanism including a perforation feeler mounted for entry into and retraction from film perforations, a control member mounted for movement in a first direction from a first to a second position and in an opposite second direction back to the first position, drive spring means urging the control member in the first direction, a user-activated trigger mechanism serving when unactivated to prevent movement of the control member in the first direction, the trigger mechanism when activated not preventing such movement, and a motion-transmitting structure responding to the reaching of the second position by coupling the motor to the control member in a sense causing the latter to be returned by the motor back to the first position.

7. In a camera as defined in claim 6, the control member being a crank rod, the control mechanism including a crankwheel to which the crank rod is coupled, the motion-transmitting structure being driven by the crankwheel and being decoupled from the motor during movement of the rod to the second position but at that time being moved by the crankwheel to a position coupled to the motor and thereupon transmitting force from the motor to the crankwheel causing the latter to move the crank rod back to first position.

8. In a camera as defined in claim 6, the control member being coupled to the shutter unit and setting the shutter unit during the second-direction movement of the control member.

9. In a camera as defined in claim 6, the motion-transmitting structure being coupled to the control member and being moved by the latter during the first-direction movement thereof into a position coupled to the motor.

10. In a camera as defined in claim 6, the drive spring means being permanently coupled to the control member and always urging the control member in the first direction.

11. In a camera as defined in claim 6, the user-activated trigger mechanism including a portion which physically obstructs the path of movement of the control member in the first direction when the user-activated trigger mechanism is unactivated but which moves out of the path of movement of the control member when the user-activated trigger mechanism is activated.

12. In a camera as defined in claim 6, the drive spring means being permanently coupled to the control member and always urging the control member in the first direction, the user-activated trigger mechanism including a portion which physically obstructs the path of movement of the control member in the first direction when the useractivated trigger mechanism is unactivated but which moves out of the path of the path of movement of the control member when the user-activated trigger mechanism is activated.

13. In a camera as defined in claim 6, the motion-transmitting structure being so configured that the distance through which the control rod is driven by the drive spring means in the first direction and the distance through which the control member is driven in the second direction by the electric motor are approximately equal.

14. In a photographic still camera, a film-transport system transporting film of the type each of whose frames has a perforation, including a shutter unit having a triggerable set state and a triggered unset state; an electric film-transport and shutter-setting motor; motor-energize switch means and motor-short-circuit switch means having states which do and do not energize and short-circuit the motor; and a control mechanism establishing at least one of said states, the control mechansim including a perforation feeler mounted for entry into and retraction from film perforations, a crankwheel and a crank rod coupled thereto, the crank rod being mounted for movement in a first direction from a first to a second position and in an opposite second direction back to the first position, the crankwheel performing one rotation in the course of such movement from and back to the first position, biasing means urging the crank rod in the first direction, a user-activated trigger mechanism engaging the crank rod and when unactivated blocking movement of the rod in the first direction, the trigger mechanism when activated permitting the biasing means to move the crank rod towards the second position and thereby rotate the crankwheel, a gear segment coupled to and driven by the crankwheel when the crank rod is moving in the first direction, a transmission driven by the motor, the angular span and angular position of the gear segment being such that after part of a crankwheel rotation the gear segment comes into engagement with and starts to be driven by the transmission thereby driving the crankwheel and moving the crank rod in the second direction back towards the first position whereupon the gear segment reaches an angular position losing engagement with the transmission, the crank rod having a trigger projection, the shutter unit having a trigger located in the path of movement of the trigger projection, the trigger projection striking the trigger as the crank rod moves in the first direction.

15. In a photographic still camera, a film-transport system transporting film of the type each of whose frames has a perforation, including a shutter unit having a triggerable set state and a triggered unset state; an electric film-transport and shutter-setting motor; motor-energize switch means and motor-short-circuit switch means having states which do and do not energize and short-circuit the motor; and a control mechanism establishing at least one of said states, the control mechansim including a perforation feeler mounted for entry into and retraction from film perforations, a crankwheel and a crank rod coupled thereto, the crank rod being mounted for movement in a first direction from a first to a second position and in an opposite second direction back to the first position, the crankwheel performing one rotation in the course of such movement from and back to the first position, biasing means urging the crank rod in the first direction, a user-activated trigger mechanism engaging the crank rod and when unactivated blocking movement of the rod in the first direction, the trigger mechanism when activated permitting the biasing means to move the crank rod towards the second position and thereby rotate the crankwheel, a gear segment coupled to and driven by the crankwheel when the crank rod is moving in the first direction, a transmission driven by the motor, the angular span and angular position of the gear segment being such that after part of a crankwheel rotation the gear segment comes into engagement with and starts to be driven by the transmission thereby driving the crankwheel and moving the crank rod in the second direction back towards the first position whereupon the gear segment reaches an angular position losing engagement with the transmission, the crank rod having a reset part, the shutter unit having a reset member located in the path of movement of the reset part, the reset part engaging the reset member and resetting the shutter unit during travel of the crank rod in the second direction.

16. In a camera as defined in claim 15, the reset part being a rack on the crank rod, the reset member being a geared member, the rack engaging the geared member and rotating it during travel of the crank rod in the second direction.

17. In a photographic still camera, a film-transport system transporting film of the type each of whose frames has a perforation, including a shutter unit having a triggerable set state and triggered unset state; an electric film-transport and shutter-setting motor; motor-energize switch means and motor-short-circuit switch means having states which do and do not energize and short-circuit the motor; and a control mechanism establishing at least one of said states, the control mechanism including a perforation feeler mounted for entry into and retraction from film perforations, a crankwheel and a crank rod coupled thereto, the crank rod being mounted for movement in a first direction from a first to a second position and in an opposite second direction back to the first position, the crankwheel performing one rotation in the course of such movement from and back to the first position, biasing means urging the crank rod in the first direction, a user-activated trigger mechanism engaging the crank rod and when unactivated blocking movement of the rod in the first direction, the trigger mechanism when activated permitting the biasing means to move the crank rod towards the second position and thereby rotate the crankwheel, a gear segment coupled to and driven by the crankwheel when the crank rod is moving in the first direction, a transmission driven by the motor, the angular span and angular position of the gear segment being such that after part of a crankwheel rotation the gear segment comes into engagement with and starts to be driven by the transmission thereby driving the crankwheel and moving the crank rod in the second direction back towards the first position whereupon the gear segment reaches an angular position losing engagement with the transmission, the switch means comprising a motor-energize switch and a motor-short-circuit switch, the crank rod having a camming pin, the control mechanism furthermore including a cammed lever provided with a cam surface by the camming pin, the cammed lever accordingly assuming a position dependent upon the position of the crank rod, the cammed lever being coupled to and opening and closing the motor-energize switch and the motor-short-circuit swith in dependence upon the position of the crank rod.

18. In a camera as defined in claim 17, the motor-energize switch and the motor-short-circuit switch each comprising a respective stationary contact and sharing a movable contact alternatively engageable with one or the other of the stationary contacts, the control mechanism including a further lever having one arm which engages the feeler and another arm which is both pivotally and shiftably coupled to the cammed lever and furthermore has a switch-control projection engaging and controlling the setting of the movable contact, and a biasing spring urging said one arm of the further lever against the feeler.

19. In a camera as defined in claim 18, the camming pin on the crank rod leaving engagement with the cam surface of the cammed lever at the terminal part of the movement of the crank rod in the second direction, the cammed lever urging the further lever in a direction such that the switch-control projection on the latter keeps the movable contact engaged with the stationary contact of the motor-energize switch so long as the camming pin and cammed lever are engaged, the feeler urging the further lever in a direction such that the switch-control projection on the latter keeps the movable contact engaged with the stationary contact of the motor-energizable switch so long as the feeler has not entered a film perforation, whereby if film is present in the camera the movable contact stays engaged with the stationary contact of the motor-energize switch until the feeler enters a film perforation but in the event film is not present in the camera then only until the camming pin and cammed lever disengage.

20. In a camera as defined in claim 19, furthermore including a crank-rod sensing lever, the sensing lever being pivotable between locking position in which it locks the cammed lever so that the latter urges the further lever in the direction keeping the motor-energize switch closed and an unlocking position, and a biasing spring urging the sensing lever towards the crank rod, the crank rod when not in the first position permitting the biasing spring to keep the sensing lever in the locking position but otherwise keeping the sensing lever in the unlocking position.

21. In a camera as defined in claim 17, the control mechanism furthermore including a further lever having one arm which engages the feeler and another arm which is coupled to the cammed lever, the further lever having a switch-control projection controlling the setting of the motor-energize switch, and a biasing spring urging said one arm of the further lever against the feeler, the switch means including two series-connected electrical switches connected in the current path of the motor, one of the two series-connected switches being located to close when the user-activated trigger mechanism is activated, the shutter unit having a moving part assuming two different positions depending upon the state of the shutter unit, the other of the two series-connected switches being located in the path of the moving part so as to close when the shutter unit is in unset state, furthermore including a parallel switch connected in parallel with the series-connected switches to form a parallel combination, a centrifugal-force switch controller coupled to the motor and closing the parallel switch when the motor is in operation, the motor-energize switch being connected in series with said parallel combination.

22. In a camera as defined in claim 17, the control mechanism furthermore including a further lever having a first arm which engages the feeler, a second arm which is coupled to the cammed lever and which is provided with a switch-control projection controlling the setting of the motor-energize switch, and a biasing spring urging the first arm of the further lever against the feeler, the further lever having a third arm, furthermore including a two-armed lever having a first arm pin-and-slot coupled to the third arm of the further lever and having a second arm, furthermore including a blocking lever spring-biased towards a position blocking first-direction movement of the crank rod, the feeler when not in a film perforation pressing the blocking lever away from the blocking position thereof through the intermediary of the further lever and the two-armed lever.

23. In a photographic still camera, a film-transport system transporting film of the type whose frames are provided with perforations, including a shutter unit having a triggerable set state and a triggered reset state; an electric filmtransport and shutter-setting motor; motor-control switch means having a motor-energize state and a motor-deenergize state; and a control mechanism establishing at least one of said states, the control mechanism including a perforation feeler mounted for entry into and retraction from film perforations, a control member mounted for movement in a first direction from a first to a second position and in an opposite second direction back to the first position, biasing means urging the control member in the first direction, a user-activated trigger mechanism serving when unactivated to prevent movement of the control member in the first direction, the trigger mechanism when activated not preventing such movement, and a motion-transmitting structure responding to the reaching of the second position by coupling the motor to the control member in a sense causing the latter to be returned by the motor back to the first position, the control mechanism furthermore including coupling means coupling the perforation feeler and the control member to the motor-control switch means and keeping the latter in the motor-energize state when the feeler is not inserted into a film perforation and during part of the second-direction movement of the control member, such that if no film is present in the camera and the feeler is accordingly incapable of keeping the motor-control switch means in the motor-energize state via the coupling means then such state will be maintained via the coupling means during said part of the second-direction movement of the control member.

24. In a photographic still camera, a film-transport system transporting film of the type whose frames are provided with perforations, including a shutter unit having a triggerable set state and a triggered unset state; an electric filmtransport and shutter-setting motor; motor-control switch means having a motor-energize state and a motor-deenergize state; and a control mechanism establishing at least one of said states, the control mechanism including a perforation feeler mounted for entry into and retraction from film perforations, a control member mounted for movement in a first direction from a first to a second position and in an opposite second direction back to the first position, biasing means urging the control member in the first direction, a user-activated trigger mechanism serving when unactivated to prevent movement of the control member in the first direction, the trigger mechanism when activated not preventing such movement, and a motion-transmitting structure responding to the reaching of the second position by coupling the motor to the control member in a sense causing the latter to be returned by the motor back to the first position, furthermore including a latching member coupled to and moved by the feeler, the latching member moving into a position latching the control member in the first position when the feeler is in non-retracted position and not thusly latching the control member when the feeler is in retracted position.

* * * * *